United States Patent
Park et al.

(10) Patent No.: US 10,880,877 B2
(45) Date of Patent: Dec. 29, 2020

(54) METHOD FOR RECEIVING DATA BY TERMINAL IN WIRELESS COMMUNICATION SYSTEM

(71) Applicant: LG ELECTRONICS INC., Seoul (KR)

(72) Inventors: Jonghyun Park, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 16/074,764

(22) PCT Filed: Feb. 2, 2017

(86) PCT No.: PCT/KR2017/001127
§ 371 (c)(1),
(2) Date: Aug. 1, 2018

(87) PCT Pub. No.: WO2017/135696
PCT Pub. Date: Aug. 10, 2017

(65) Prior Publication Data
US 2019/0045488 A1    Feb. 7, 2019

Related U.S. Application Data

(60) Provisional application No. 62/289,926, filed on Feb. 2, 2016.

(51) Int. Cl.
*H04W 72/04* (2009.01)
*H04L 5/00* (2006.01)
(Continued)

(52) U.S. Cl.
CPC .......... *H04W 72/042* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS

2015/0215905 A1*  7/2015  Park .................... H04B 7/0473
                                                        370/329
2015/0365154 A1   12/2015  Davydov et al.

FOREIGN PATENT DOCUMENTS

KR    1020140058356     5/2014
KR    1020150013561     2/2015
(Continued)

OTHER PUBLICATIONS

PCT International Application No. PCT/KR2017/001127, International Search Report dated May 18, 2017, 5 pages.

*Primary Examiner* — Willie J Daniel, Jr.
(74) *Attorney, Agent, or Firm* — Lee Hong Degerman Kang Waimey

(57) ABSTRACT

A method for decoding a physical downlink shared channel (PDSCH) by a user equipment (UE) in a wireless communication system according to an embodiment of the present invention may comprise the steps of: receiving first downlink control information (DCI) on a first PDSCH; and decoding the first PDSCH transmitted through a demodulation reference signal (DMRS) antenna port, on the basis of the first DCI, wherein, in the step of decoding the first PDSCH, a quasi-co-located (QCL) assumption with an antenna port of a reference signal (RS) type different from that of the DMRS antenna port is not applied to the DMRS antenna port, or the QCL assumption with only an antenna port of a particular RS type is applied thereto.

13 Claims, 12 Drawing Sheets

(51) Int. Cl.
  *H04B 7/024*   (2017.01)
  *H04B 7/0417*  (2017.01)
  *H04W 72/12*   (2009.01)

(52) U.S. Cl.
  CPC .......... *H04L 5/0048* (2013.01); *H04L 5/0051* (2013.01); *H04L 5/0023* (2013.01); *H04W 72/1273* (2013.01)

(56) References Cited

FOREIGN PATENT DOCUMENTS

KR   1020150060708   6/2015
KR   1020150065666   6/2015

* cited by examiner

METHOD FOR RECEIVING DATA BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/001127, filed on Feb. 2, 2017, which claims the benefit of U.S. Provisional Application No. 62/289,926, filed on Feb. 2, 2016, the contents of which are all hereby incorporated by reference herein in their entirety.

TECHNICAL FIELD

The present invention relates to a wireless communication system and more particularly, to a method for a terminal to receive a Physical Downlink Shared Channel (PDSCH) in a reliable manner and an apparatus for performing the method.

BACKGROUND ART

Mobile communication systems have been developed to provide voice services, while guaranteeing user activity. Service coverage of mobile communication systems, however, has extended even to data services, as well as voice services. Today, an explosive increase in traffic has resulted in the shortage of resources, and there is a need for an advanced mobile communication system because users require a high speed service.

The requirements of a next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device the networking, have been researched.

DISCLOSURE

Technical Problem

An object of the present invention is to provide an efficient broadcast and multicast transmission methods for a network to perform DL transmission of the same data to a plurality of UEs.

Also, an object of the present invention is to provide a method for allowing a broadcast and multicast transmission methods for a plurality of UEs to coexist effectively with unicast transmission to a single UE.

Technical objects to be achieved by the present invention are not limited to those described above, and other technical objects not mentioned above may also be clearly understood from the descriptions given below by those skilled in the art to which the present invention belongs.

Technical Solution

A method for decoding a physical downlink shared channel (PDSCH) by a user equipment (UE) in a wireless communication system according to one embodiment of the present invention may comprise receiving first downlink control information (DCI) on a first PDSCH; and decoding the first PDSCH transmitted through a demodulation reference signal (DMRS) antenna port based on the first DCI, wherein the decoding the first PDSCH does not apply a quasi co-located (QCL) assumption with an antenna port of a reference signal (RS) type different from that of the DMRS antenna port to the DMRS antenna port or applies the QCL assumption with only an antenna port of a specific RS type thereto.

Also, the first PDSCH may be a PDSCH broadcast/multicast from a plurality of cells belonging to one cluster.

Also, the first DCI and the first PDSCH may be masked by a first radio network temporary identifier (RNTI) defined for indicating data broadcast/multicast from the one cluster.

Also, if the QCL assumption with an antenna port of a different type is not applied, the decoding the first PDSCH may estimate the channel and/or large-scale parameter (LSP) of the first PDSCH by using only the DMRS transmitted through the DMRS antenna port.

Also, is the QCL assumption with an antenna port of the specific RS type is applied, the decoding the first PDSCH may estimate the channel and LSP of the first PDSCH by applying the QCL assumption with only a cell-specific reference signal (CRS) antenna port to the DMRS antenna port.

Also, a predetermined number of resource blocks (RBs) or more may be guaranteed to be scheduled within at least one subframe with respect to a first PDSCH masked by the first RNTI.

Also, the predetermined number of scheduled RBs may be predefined by a specific value or set for the UE through a radio resource control (RRC) message or system information block (SIB) message.

Also, the method for decoding a PDSCH by a UE may further comprise decoding the second PDSCH masked with a second RNTI transmitted through a same subframe as the first DCI, when a second DCI masked with the second RNTI of a different type than the first RNTI is simultaneously detected through the same subframe as the first DCI, wherein the second PDSCH is decoded by applying a QCL assumption different from the QCL assumption applied for decoding of the first PDSCH.

Also, when a second DCI masked by a second RNTI of which the type is different from that of the first RNTI is defined, the first DCI may be restricted not to be transmitted together with the second DCI in the same subframe.

Also, when a second DCI masked by a second RNTI of which the type is different from that of the first RNTI is defined, a first time period during which the first DCI is blind-detected and a second time period during which the second DCI is blind-detected may be set individually.

Also, whether to apply the QCL assumption with an antenna port of a different RS type may be determined for each LSP.

Also, only the Average delay parameter and/or the Doppler shift parameter of the parameters defined as the LSPs may be applied the QCL assumption with only an antenna port of the specific RE type.

Also, the first DCI may be transmitted through a physical downlink control channel (PDCCH) or enhanced PDCCH (EPDCCH).

Also, a user equipment (UE) decoding a physical downlink shared channel (PDSCH) in a wireless communication system according to another embodiment of the present invention may comprise a Radio Frequency (RF) unit for transmitting and receiving a radio signal; and a processor controlling the RF unit, wherein the processor is configured to receive first downlink control information (DCI) for a first PDSCH; and to decode the first PDSCH transmitted through a demodulation RS (DMRS) antenna port based on the first DCI, wherein a quasi co-located (QCL) assumption with an antenna port of a reference signal (RS) type different from that of the DMRS antenna port is not applied to the DMRS antenna port or the QCL assumption with only an antenna port of a specific RS type is applied thereto.

Also, the first PDSCH may be a PDSCH broadcast/multicast from a plurality of cells belonging to one cluster.

Advantageous Effects

According to one embodiment of the present invention, multicast/broadcast transmission may be effective to deliver data generated at a particular location quickly to a plurality of UEs in the vicinity of the location.

Also, according to one embodiment of the present invention, the network may broadcast/multicast data received from a transmitting UE to the UEs located in the surroundings of the transmitting UE accurately and with high reliability.

The advantageous effects that may be achieved from the present invention are not limited to those described above, and other effects not mentioned above may also be clearly understood from the descriptions given below by those skilled in the art to which the present invention belongs.

DESCRIPTION OF DRAWINGS

The accompanying drawings, which are included herein as a part of a description in order to help understanding of the present invention, provide embodiments of the present invention, and describe the technical features of the present invention with the description below.

MODE FOR INVENTION

Figure 1:
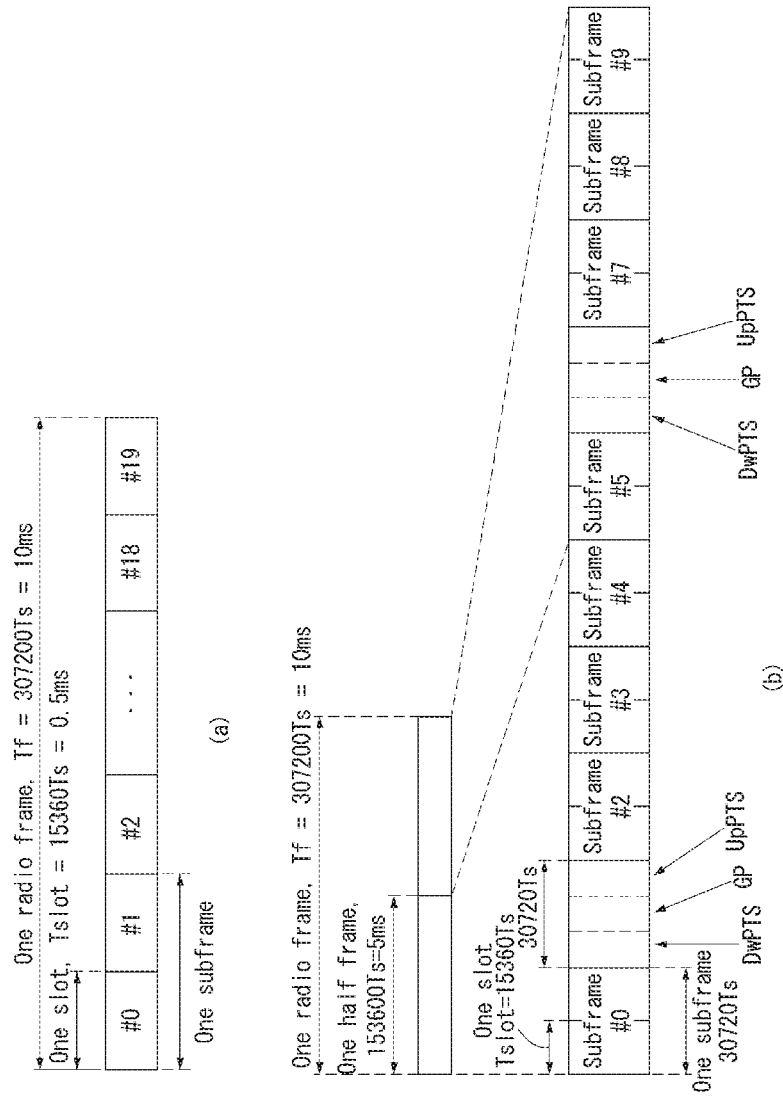
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16

(WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

Figure 2:
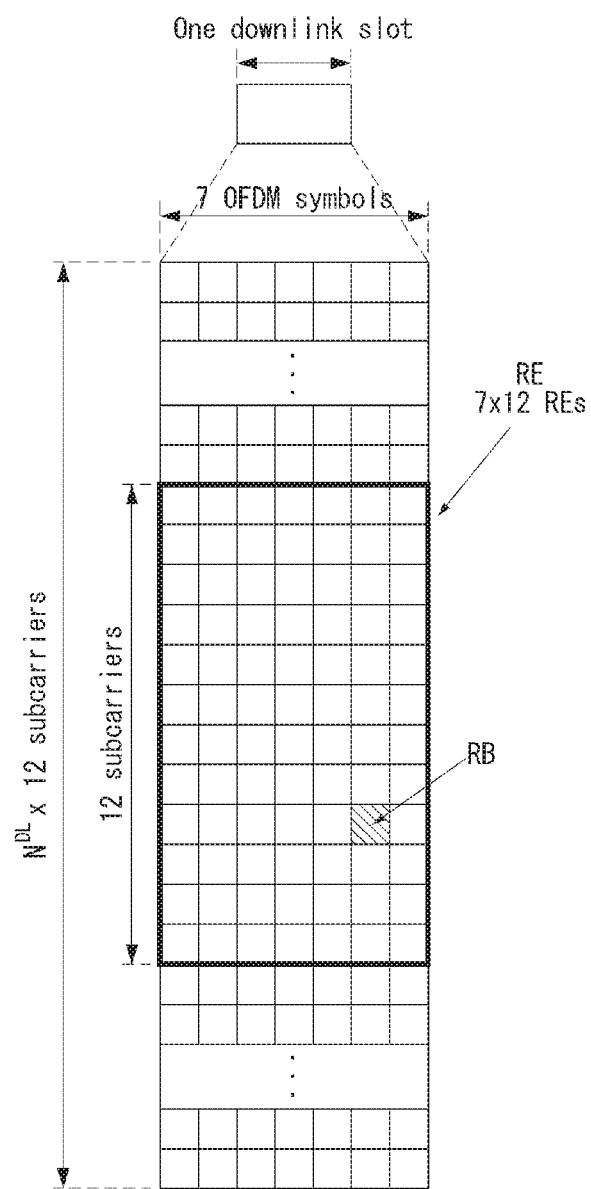
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

Figure 3:
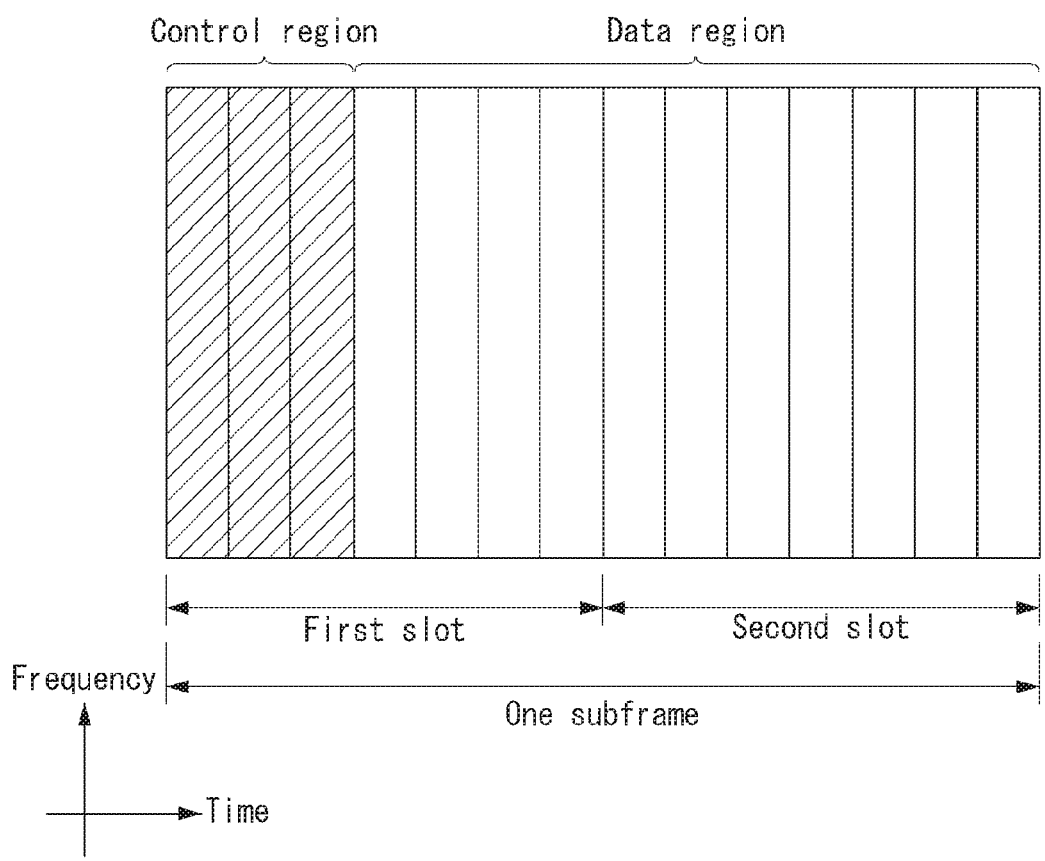
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
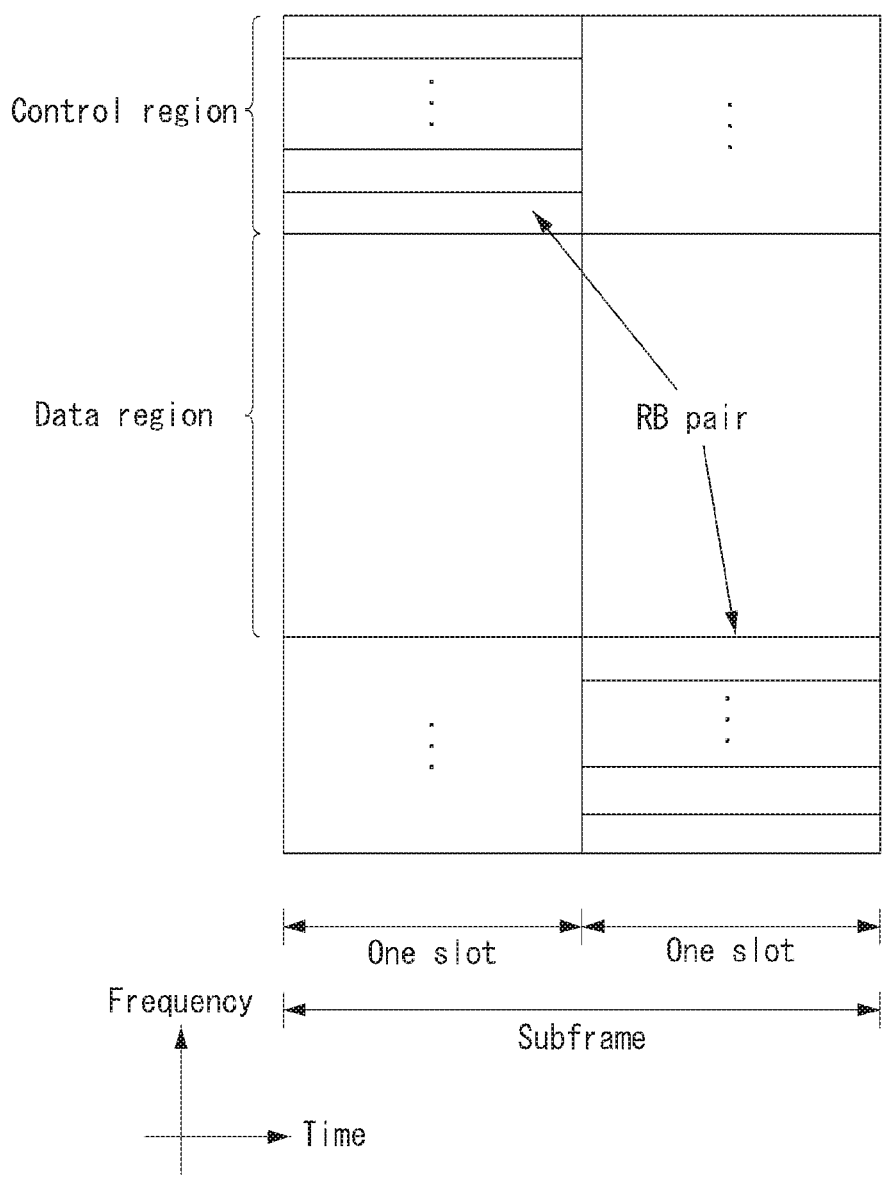
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.
CRS: cell-specific reference signal
MBSFN RS: multicast-broadcast single-frequency network reference signal
UE-specific RS or demodulation RS (DM-RS)
PRS: positioning reference signal
CSI-RS: channel state information reference signal
One RS is transmitted for each downlink antenna port.

The CRS is transmitted in every downlink subframe within a cell supporting PDSCH transmission. The CRS is transmitted in one or more of antenna ports 0 to 3. The CRS is defined only in $\Delta f=15$ kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports $p=5$, $p=7$, $p=8$ or $p=7$, 8, ..., $v+6$. Here, $v$ is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in $\Delta f=15$ kHz.

The CSI-RS is transmitted in 1, 2, 4, or 8 number of antenna ports using $p=15$, $p=15,16$, $p=15, \ldots, 18$, and $p=15, \ldots, 22$, respectively.

The CSI-RS is defined only in $\Delta f=15$ kHz.

The reference signal (RS) will be described in more detail.

The CRS is an RS for obtaining information regarding a state of a channel shared by every terminal within a cell and measuring handover, or the like. The DM-RS is used for data demodulation only for a specific UE. Information for demodulation and channel measurement may be provided using such reference signals. That is, the DM-RS is used only for data demodulation, and the CRS is used for both purposes of channel information obtaining and data demodulation.

The receiving side (i.e., UE) measures a channel state from the CRS, and feeds back an indicator related to channel quality such as a CQI (Channel Quality Indicator), a PMI (Precoding Matrix Index), a PTI (Precoding Type Indicator) and/or an RI (Rank Indicator) to the transmitting side (i.e., Base Station). Meanwhile, a reference signal related to feedback of channel state information (CSI) may be defined as a CSI-RS.

The DM-RS may be transmitted through resource elements when data on a PDSCH is required to be demodulated. The UE may receive whether a DM-RS is present through a higher layer, and may be valid only when the corresponding PDSCH is mapped. The DM-RS may be called a UE-specific RS or a demodulation RS (DMRS).

Figure 5:
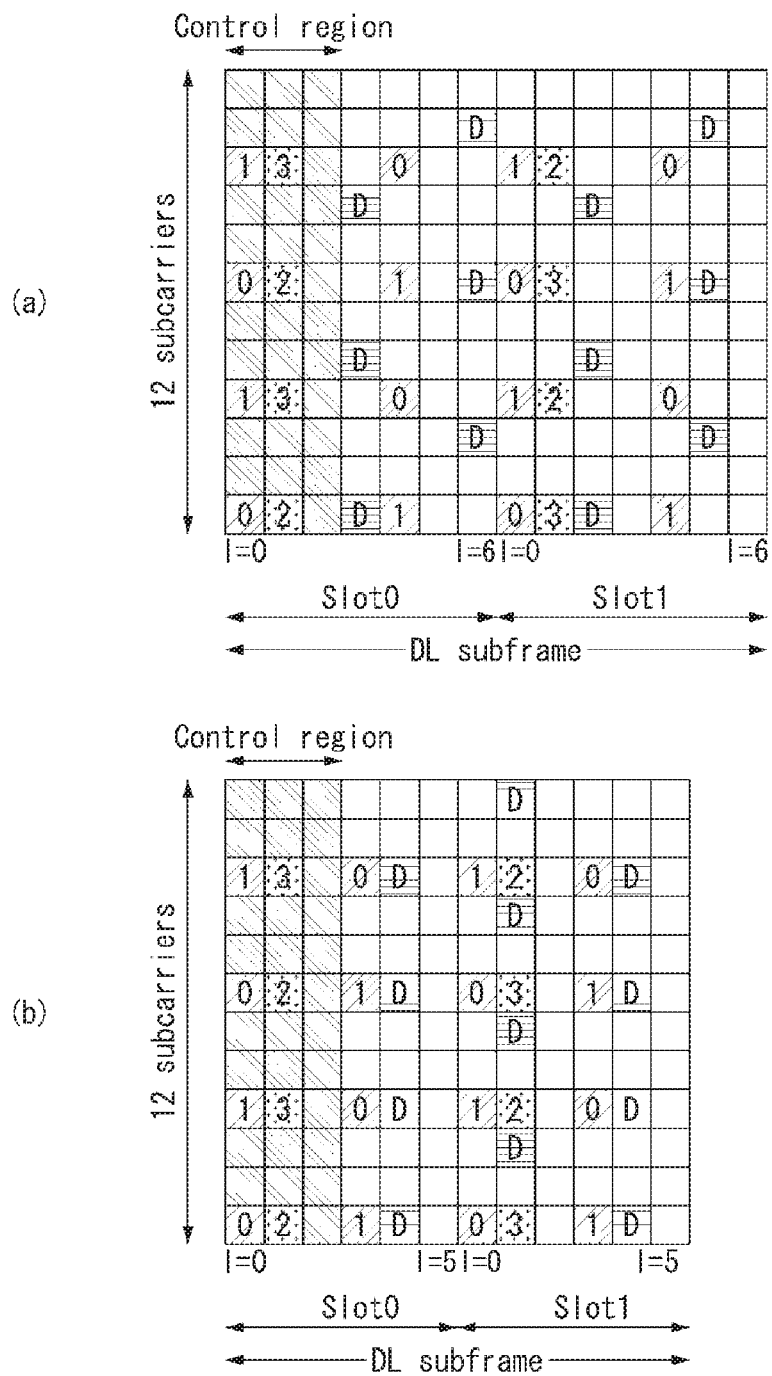
FIG. 5 illustrates a reference signal pattern mapped to a downlink resource block pair in a wireless communication system to which the present invention may be applied.

FIG. 5 illustrates a reference signal pattern mapped to a downlink resource block pair in a wireless communication system to which an embodiment of the present invention may be applied.

Referring to FIG. 5, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 10($a$)) and has a length of 12 OFDM symbols in the case of an extended CP (FIG. 10($b$)). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

Figure 6:
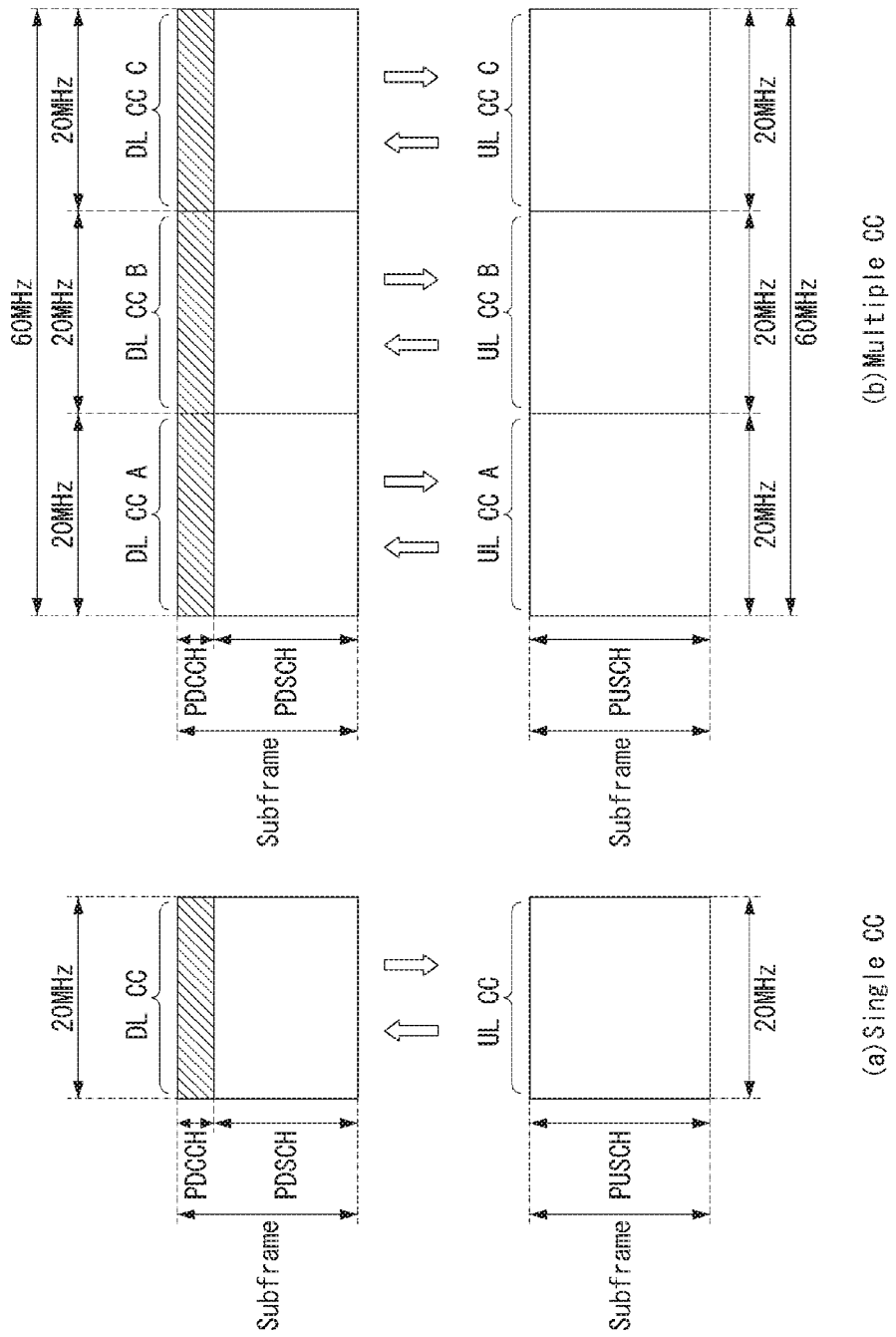
FIG. 6 illustrates one example of a component carrier and carrier aggregation in a wireless communication system to which the present invention may be applied.

FIG. 6 shows an example of component carriers and carrier aggregation in a wireless communication system to which an embodiment of the present invention may be applied.

(a) of FIG. 6 illustrates a single carrier structure used in an LTE system. Component carriers include a DL CC and a UL CC. One CC may have a frequency range of 20 MHz.

(b) of FIG. 6 illustrates a carrier aggregation structure used in an LTE_A system. (b) of FIG. 6 illustrates a case in which three CCs having a frequency size of 20 MHz are combined. Three DL CCs and three UL CCs are provided, but there is no limitation in the number of DL CCs and UL CCs. In the case of carrier aggregation, the UE may simultaneously monitor three CCs, receive downlink signal/data, and transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specifically, UE group-specifically, or cell-specifically.

If cross-carrier scheduling is deactivated, it means that a PDCCH monitoring set is always the same as UE DL CC set.

In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

Figure 7:
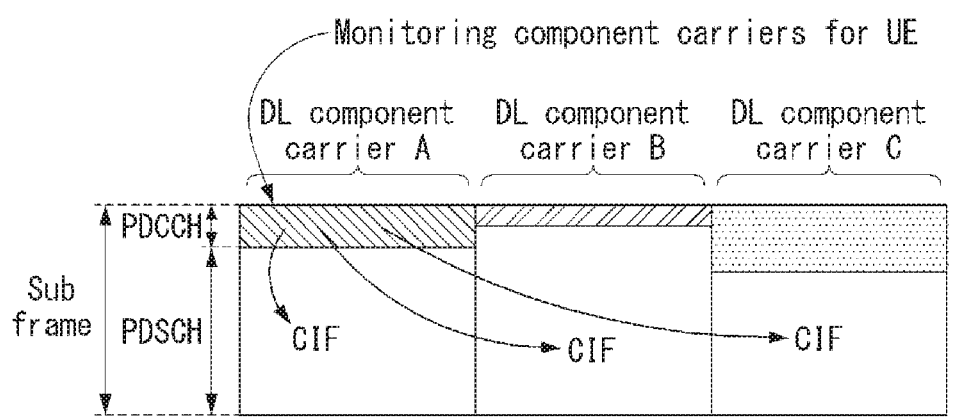
FIG. 7 illustrates one example of a subframe structure according to cross carrier scheduling in a wireless communication system to which the present invention may be applied.

FIG. 7 shows an example of a structure of a subframe according to cross-carrier scheduling in a wireless communication system to which an embodiment of the present invention may be applied.

Referring to FIG. 7, in a DL subframe for an LTE-A UE, three DL CCs are combined and DL CC 'A' indicates a case set with a PDCCH monitoring DL CC. In case where a CIF is not used, each DL CC may transmit a PDCCH scheduling a PDSCH thereof without a CIF. Meanwhile, in case where the CIF is used through higher layer signaling, only one DL CC 'A' may transmit the PDCCH scheduling a PDSCH thereof or a PDSCH of another CC using the CIF. Here, DL CC 'B' and 'C' not set as PDCCH monitoring DL CCs do not transmit the PDCCH.

PDCCH Transmission

The eNB determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

CA-Based CoMP Operation

In system subsequent to LTE, cooperative multi-point (CoMP) transmission may be implemented using a carrier aggregation (CA) function in LTE.

Figure 8:
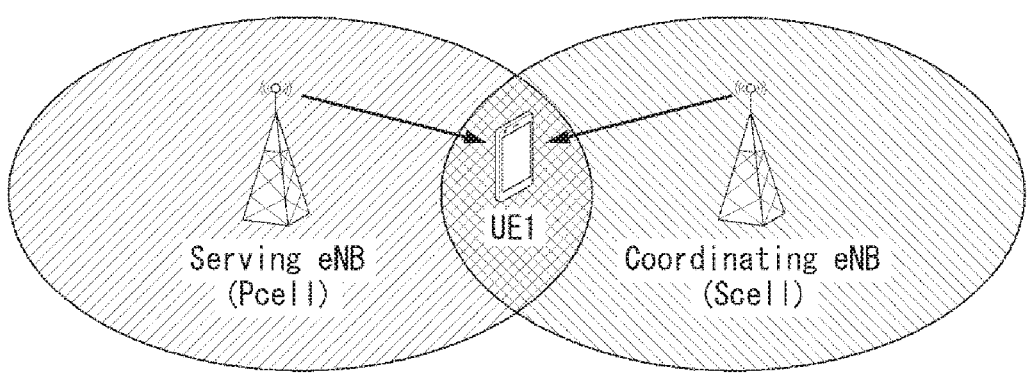
FIG. 8 illustrates a carrier aggregation-based CoMP system in a wireless communication system to which the present invention may be applied.
Figure 8:
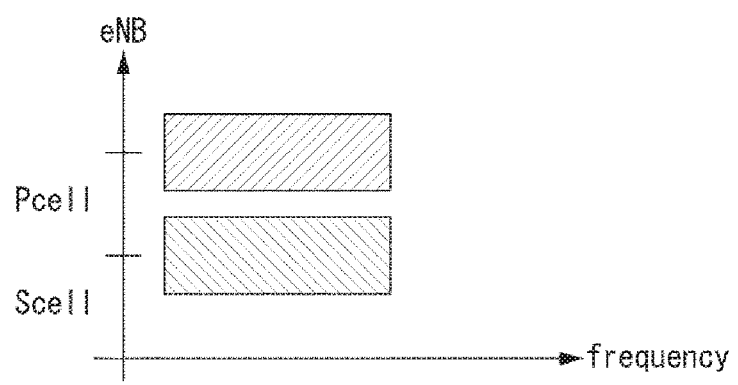

FIG. 8 is a diagram illustrating a carrier aggregation-based CoMP system in a wireless communication system to which an embodiment of the present invention may be applied.

FIG. 8 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 8 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 5 illustrates a PDCCH and PDSCH configured by an SI-RNTI.

TABLE 5

| DCI Format | Search Space | Method for sending PDSCH corresponding to PDCCH |
| --- | --- | --- |
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 6 illustrates a PDCCH and PDSCH configured by a P-RNTI.

TABLE 6

| DCI Format | Search Space | Method for sending PDSCH corresponding to PDCCH |
| --- | --- | --- |
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 7 illustrates a PDCCH and PDSCH configured by an RA-RNTI.

TABLE 7

| DCI Format | Search Space | Method for sending PDSCH corresponding to PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
UE does not receive a PDSCH RB transmitted in the antenna port 5 even in any subframe in which the number of OFDM symbols for a PDCCH having a common CP is 4.
If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.
UE does not receive a PDSCH RB transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.
If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.
If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.
If a common CP is configured, UE does not receive a PDSCH in the antenna port 5 in which distributed VRB resource allocation has been assigned within a special subframe in an uplink-downlink configuration #1 or #6.
UE does not receive a PDSCH transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 8 illustrates a PDCCH and PDSCH configured by a C-RNTI.

TABLE 8

| transmission mode | DCI Format | Search Space | Method for sending PDSCH corresponding to PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | large delay CDD or transmit diversity |
| Mode 4 | DCI format 1A | common and UE-specific by a C-RNTI | transmit diversity |
| | DCI format 2 | UE-specific by a C-RNTI | closed-loop spatial multiplexing or transmit diversity |
| Mode 5 | DCI format 1A | common and UE-specific by a C-RNTI | transmit diversity |
| | DCI format 1D | UE-specific by a C-RNTI | multi-user MIMO |

TABLE 8-continued

| transmission mode | DCI Format | Search Space | Method for sending PDSCH corresponding to PDCCH |
|---|---|---|---|
| Mode 6 | DCI format 1A | common and UE-specific by a C-RNTI | transmit diversity |
| | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
| | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 9 illustrates a PDCCH and PDSCH configured by an SPS C-RNTI.

TABLE 9

| transmission mode | DCI Format | Search Space | Method for sending PDSCH corresponding to PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 9. The PDSCH corresponding to the PDCCH(s) is scrambling-initialized by the temporary C-RNTI.

Table 10 illustrates a PDCCH and a PDSCH configured by a temporary C-RNTI.

TABLE 10

| DCI format | Search Space | Method for sending PDSCH corresponding to PDCCH |
|---|---|---|
| DCI format 1A | common and UE-specific by a temporary C-RNTI | If the number of PBCH antenna ports is 1, a single antenna port, a port 0 is used, and if not, transmit diversity |

TABLE 10-continued

| DCI format | Search Space | Method for sending PDSCH corresponding to PDCCH |
|---|---|---|
| DCI format 1 | UE-specific by a temporary C-RNTI | If the number of PBCH antenna ports is 1, a single antenna port, a port 0 is used, and if not, transmit diversity |

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports.

Method for Transmitting and Receiving Multi-Cell Coordinated Broadcast (MCCB) Packets The present invention proposes an efficient broadcast and multicast transmission methods for the network to perform DL transmission of the same data to a plurality of UEs and also proposes a method for allowing the broadcast and multicast methods to coexist effectively with unicast transmission to a single UE. Here, broadcast/multicast transmission may be performed so that one cell transmits data by using an RS and a format similar to those for existing unicast transmission. Similarly, broadcast/multicast transmission may be performed so that multiple cells transmit the same data by using a separate RS and format different from those for unicast transmission (in particular, an RS and a format composed to combine signals received from a plurality of cells appropriately). At this time, the former case may be called single cell point-to-multipoint (SC-PTM) transmission, and the latter case multicast and broadcast in single frequency network (MBSFN) transmission.

Multicast/broadcast transmission may be effective for delivering data generated at a particular location quickly to a plurality of UEs in the vicinity of the corresponding location. As one example, there are cases when a vehicle corresponding to a UE may inform other surrounding vehicles of data holding a series of information related to driving (for example, data informing that the vehicle is out of order). It is not necessary to deliver such data to distant UEs located away beyond a predetermined distance from the UE which has generated the corresponding data, but the data needs to be delivered simultaneously to the UEs located in an area within a predetermined distance. Therefore, in this case, it may be preferable that cells located within a predetermined distance from a UE generating data broadcast/multicast the corresponding data to the UEs within their coverage.

However, as described above, since a particular type of UEs such as vehicles may move with a high speed, it may be difficult for each network to determine an accurate position of a fast-moving UE, and moreover, the UE may perform handover frequently. Also, to avoid the frequent handover, a UE which does not require communication with the network may participate in data (for example, data which informs of the vehicle state) transmission and reception even in the RRC_Idle state; in this case, since the UE does not make an RRM report, it may be even more difficult for the network to figure out the accurate position of the UE. Therefore, it may be difficult for the network to broadcast/multicast data received from a transmitting UE to those UEs in the vicinity of the transmitting UE accurately and with high reliability.

Meanwhile, there are times when a plurality of UEs belonging to a reception area of data transmitted from a transmitting UE are distributed over coverage areas of a plurality of cells, which occurs when the transmitting UE is located at a cell boundary or when data (for example, emergency data informing of occurrence of a collision accident) is generated to be delivered to UEs distributed over a very wide area.

Figure 9:
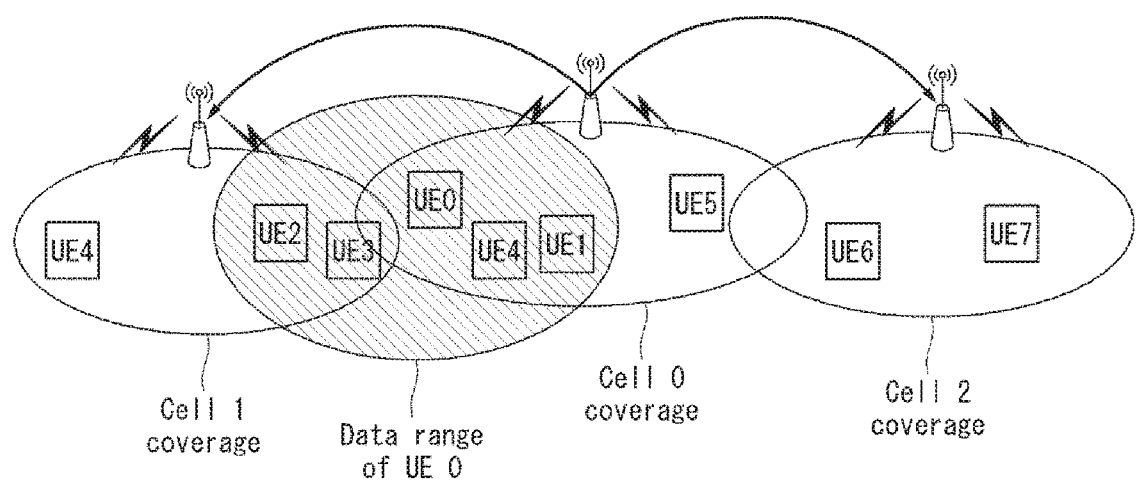
FIG. 9 illustrates a broadcast/multicast transmission method of a plurality of cells according to one embodiment of the present invention.

FIG. 9 illustrates a broadcast/multicast transmission method of a plurality of cells according to one embodiment of the present invention. FIG. 9 assumes a situation in which UE0 located in the coverage area of cell 0 generates data and UE0 has to transmit the data to UEs (UE1 to UE4) in the surroundings of UE0.

Referring to FIG. 9, UE0 may first transmit the data to the eNB of cell 0, which is close to UE0. In this case, the network which has received the corresponding data gets to know that UE0 is located in the coverage area of cell 0 but does not know the exact location of UE0. Therefore, in this case, at least one cell which covers a sufficiently large area to include the region in which the data of UE0 are transmitted and received to and from other UEs (for example, a D2D communication or V2X communication region) may be selected as a cell for broadcasting/multicasting the UE0 data. In the embodiment of FIG. 9, cell 0 to which UE0 belongs may perform broadcast/multicast transmission by default, and cell 1 and cell 2 adjacent to cell 0 may participate in the broadcast/multicast transmission of cell 0. Through this operation, all of the UEs within the coverage area of data transmission and reception of UE0 may receive a broadcast/multicast message with which their closest cells/eNBs (or with which the cells/eNBs to which the UEs belong) are involved for transmission.

However, like UE5, some UEs may belong to the same cell together with the UEs belonging to the data region of UE0 (namely UE1 and UE4) but may not belong to the data region of UE0; on the other hand, some cell, for example, cell 2 to which UE6 and UE7 belong, may not have a region overlapping with the data region of UE0 but may have to participate in the broadcast/multicast transmission of cell 0.

To perform the aforementioned operation effectively, it is important to construct a cluster for data transmission in an appropriate manner. At this time, the term cluster may refer to a set of at least one cell/eNB participating in multicast/broadcast transmission of specific data. Cells/eNBs belonging to the same cluster may perform MBSFN transmission for which the cells/eNBs synchronize with each other and transmit the same signal through the same resource or may transmit the same data according to the SC-PTM transmission scheme through a different resource as a different signal.

If the size of a cluster is too small, the cluster may not fully include (or cover) the data region of a transmitting UE (for example, UE0). In particular, in the case of data which have to be delivered with a high degree of reliability, it is necessary for a cluster to fully include or cover the UE(s) belonging to the transmission and reception range of the corresponding data. On the other hand, if the size of a cluster is excessively large, network resources are wasted. Therefore, a cluster for data transmission has to be constructed to have an appropriate size.

Figure 10:
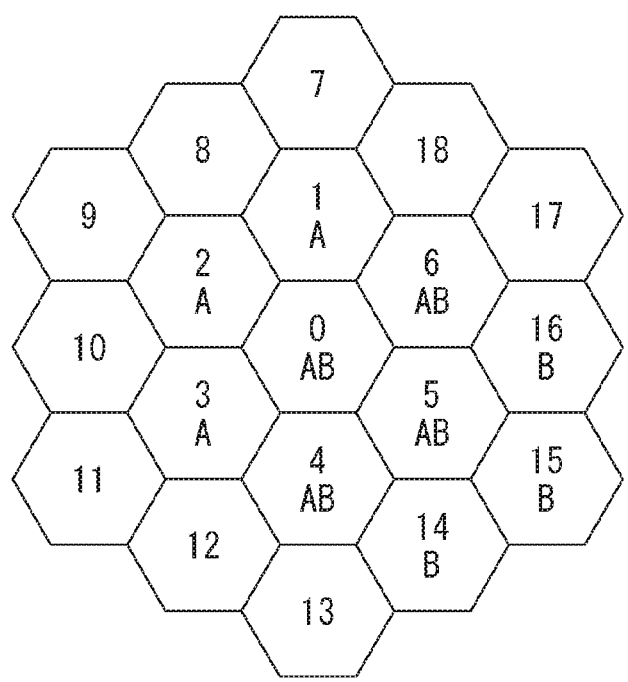
FIG. 10 illustrates clusters constructed according to one embodiment of the present invention.

FIG. 10 illustrates clusters constructed according to one embodiment of the present invention.

Suppose a cluster comprising a plurality of cells transmit data of one cell. If a cluster is constructed separately to transmit data generated in each cell, clusters may eventually overlap with each other, and one cell may belong to multiple clusters. This in turn means that the same cell may belong to a plurality of different clusters depending on the type of data to be transmitted, in particular, depending on the cell which generates data transmitted by a cluster.

For example, as shown in FIG. 10, a cluster constructed to deal with the data generated by one cell may be assumed to be a set comprising the corresponding cell and 6 cells surrounding the cell. In this case, the data generated in cell 0 is transmitted from the cluster composed of cell 0, 1, 2, 3, 4, 5, and 6 which are denoted by the names that contain the letter A. Meanwhile, the data generated in cell 5 is transmitted from the cluster composed of cell 5, 6, 0, 4, 14, 15, and 16 which are denoted by the names that contain the letter B. Therefore, while belonging to the cluster transmitting the data of cell 0, the cell 0, 4, 5, and 6 also belong to the cluster transmitting the data of cell 5.

Meanwhile, an appropriate cluster size may be determined according to the size of each data region. For the data transmitted to a relatively narrow data region, the cluster size may be safely determined to be small; however, a large-sized cluster is required to deal with data transmitted from a relatively large data region. This may indicate that although the same UE may generate data at the same location, the corresponding cluster may be constructed differently according to the data type and data transmission and reception region.

On the basis of the operation example described above, in the presence of a set (namely, a cluster) of cells participating in the specific multicast/broadcast transmission (in what follows, it is called "multi-cell coordinated broadcast (MCCB)"), the present invention proposes a method which enables a UE to effectively receive the MCCB packets transmitted from the cells. Before delving into the method, technical backgrounds which underpin the present invention will be described below. The Rel-11 of the 3GPP standard defines the QCL type A or QCL type B as described below, and TM10 specifies that either of the two may be set to a UE through RRC signaling.

Antenna Port QCL for PDSCH

A UE set to the transmission mode 8-10 for a serving cell assumes that antenna ports 7 to 14 of the serving cell are quasi co-located (QCLed) with respect to the delay spread, Doppler spread, Doppler shift, average gain, and average delay of a given subframe. Also, a UE set to the transmission mode 1-9 for a serving cell assumes that antenna ports 0 to 3, 5, and 7 of the serving cell are QCLed with respect to the Doppler shift, Doppler spread, average delay, and delay spread of a given subframe.

A UE set to the transmission mode 10 for a serving cell is set to either of the following two QCL types with respect to the serving cell by an upper layer parameter, qcl-Operation, to decode a PDSCH according to the transmission method related to the antenna ports 7 to 14.

Type A: The UE quasi-co-locates (QCLs) antenna ports 0-3 and 7-22 of the serving cell with respect to delay spread, Doppler spread, Doppler shift, and average delay.

Type B: The UE QCLs antenna ports 15-22 corresponding to the CSI-RS resource configuration identified by an upper layer parameter, qcl-CSI-RS-ConfigNZPId-r11, and QCLs antenna ports 7-14 with respect to Doppler shift, Doppler spread, average delay, and delay spread.

If a scheme for transmitting a DMRS-based PDSCH is taken into account as an efficient MCCB packet transmission method proposed according to the present invention, a specific QCL assumption is needed for a UE to decode the corresponding PDSCH (for example, the aforementioned QCL type A or B). For example, it may be defined/set to assume the QCL type A whenever a UE decodes MCCB packets.

At this time, as a method for identifying an MCCB packet, a UE may identify the MCCB packet explicitly/implicitly by using a method for masking an MCCB packet with a specific RNTI (in what follows, it is called an "MCCB-RNTI") and transmitting the masked MCCB packet. Similarly, in the QCL type A, CSI-RS related ports may be defined or configured in such a way to be excluded from the QCL assumption, which may be defined as a separate QCL type. Here, the reason why the CSI-RS related ports are excluded is that when MCCB transmission is to be received by vehicle-UEs (V-UEs) as in the V2X service/communication, mobility of V-UEs is so high that the CSI-RS to be tracked may have to be changed frequently to satisfy the QCL assumption. In such a V2X environment, it is inefficient to apply CSI-RS related ports as QCLed ports. Therefore, in a situation where MCCB packets are received, it may be configured so that only the CSR ports of a serving cell (or a specifically indicated cell) with respect to a UE may be applied to the QCL assumption employing DMRS ports.

Assuming only the QCL type A or applying a new configuration using marking of the MCCB-RNTI for reception of MCCB packets is intended to utilize large-scale parameters (LSPs) (for example, Doppler shift, Doppler spread, average gain, average delay, and delay spread) of a radio channel estimated from specific QCLed (CRS and/or CSI-RS) ports for DMRS channel estimation and PDSCH decoding when it is difficult to expect decoding performance of a DMRS-based PDSCH solely from the DMRS itself. If tracking of other RS such as CRS and/or CSI-RS itself is not easy or efficiency thereof is low due to high mobility of V-UEs as in the V2X environment or if reduction of implementation complexity of a UE is more advantageous at the expense of performance loss, supporting so-called "QCL-less" DMRS channel estimation and PDSCH decoding may be more advantageous.

To support the method above, the present invention proposes the following specific methods, and at least one of the proposed methods may be defined/configured to be applied to the specific situation described above (for example, a situation in which a specific (DMRS-based) PDSCH masked by the "MCCB-RNTI" is to be transmitted or received):

1. A PDSCH masked by the "MCCB-RNTI" (DMRS-based PDSCH) may be guaranteed to be scheduled over N RBs or more in at least one subframe. In other words, a UE does not expect that the (DMRS-based) PDSCH is scheduled over less than N RBs. For example, the number of RBs over which the (DMRS-based) PDSCH is scheduled may be defined/set to a specific value in advance (in conjunction with system bandwidth), such as 'N=10'. Similarly, the number of RBs over which the (DMRS-based) PDSCH is scheduled may be configured for the UE through RRC signaling or SIB of a specific cell (specific system information message which enables the UE to obtain information even when the UE is in the idle state).

As described above, scheduling bandwidth spanning at least N RBs or more is guaranteed for a (DMRS-based) PDSCH to utilize DMRS symbols separated from each other on the time axis to estimate/obtain frequency synchronization-related specific LSP at the time of DMRS channel estimation for reception of the (DMRS-based) PDSCH. In other words, in the case of MCCB packet transmission and reception, it is possible to guarantee DMRS density of N RBs or more by excluding the case of scheduling 1 RB, which is the minimum scheduling bandwidth, as in the conventional unicast scheduling.

In the case where a UE performs an operation for obtaining LSPs for DMRS channel estimation by using the DMRS itself through guaranteeing scheduling of at least N RBs, the corresponding operation may be defined/set as a separate, new QCL type (for example, QCL type c) in an environment which does not require the QCL assumption with additional other RS. In other words, in the aforementioned QCL type, when the UE receives an MCCB packet, instead of assuming/applying a QCL assumption with other RS, the UE has to perform both of the LSP estimation and channel estimation using only a specific RS (for example, DMRS) within the bandwidth (spanning at least N RBs or more) scheduled only for the MCCB packet.

If the aforementioned operation (for example, application of the QCL type c) is activated, it indicates that the UE may receive an MCCB packet by using a specific implementation method within a scheduled band even in an environment exhibiting high mobility. Taking into account the UE's operation, the network may perform MCS setting of an appropriate level and transmit the MCCB packet to the UE in a more reliable manner.

Similarly, an operation for obtaining the LSP for DMRS channel estimation by using the DMRS itself may be defined to be performed additionally while a predefined specific QCL type (for example, QCL type A, QCL type A excluding CSI-RS ports, or "QCL-less" decoding method utilizing the DMRS only (for example, a newly defined QCL type c)) is assumed. In this case, in addition to the operation for estimating the LSP by applying the QCL assumption with other RS (for example, CRS or CSI-RS), the LSP may be estimated by using the DMRS itself, and thereby reliability of DMRS channel estimation for receiving a DMRS-based PDSCH may be increased. To this end, as described above, scheduling bandwidth of at least N RBs or more has to be guaranteed with respect to the (DMRS-based) PDSCH.

2. A broadcast/multicast PDSCH masked by the "MCCB-RNTI" and a unicast PDSCH masked by another RNTI (for example, C-RNTI) different from the MCCB-RNTI may be scheduled simultaneously in one subframe. In this case, the UE may be defined/configured to assume/apply different QCLs (for example, different QCL types) to the respective PDSCHs (for example, PDSCHS masked by different RNTIs).

For example, the UE may perform blind detection (BD) of both of the DCI masked by the MCCB-RNTI and/or the DCI masked by the C-RNTI. When DCI masked by a C-RNTI is detected, the UE may receive the detected DCI and the corresponding (or indicated) PDSCH according to a specific QCL method (for example, QCL type A or B) appropriate for decoding of a unicast PDSCH. When DCI masked by an MCCB-RNTI is detected, the UE may receive the detected DCI and the corresponding (or indicated) PDSCH according to a specific QCL method (for example, a method according to the aforementioned embodiment such as QCL type A, QCL type A excluding the CSI-RS port, or "QCL-less" decoding method utilizing only the DMRS (for example, a newly defined QCL type C)) appropriate for decoding of an MCCB packet.

The operation of assuming different QCLs for the respective PDSCHs transmitted by different methods as described above may also be performed simultaneously within the same subframe. For example, it may be configured so that DCI masked by an MCCB-RNTI and DCI masked by a C-RNTI are both detected in the same subframe. In this case, assuming that the DCI may all be detected within one subframe, the UE has to still perform BD to check whether other DCI is still detected even when one DCI has already been detected within one subframe. If the UE has detected all of DCI from within one subframe, it indicates that the broadcast/multicast PDSCHs (or MCCB-PDSCHs or MCCB packets) and unicast PDSCHs are all scheduled for the corresponding subframe, and to receive all of the PDSCHs, the UE may apply different QCL assumptions to the respective PDSCHs as described above. For example, the UE may apply the QCL assumption based on the preset/predefined QCL type A or B at the time of receiving a unicast PDSCH but apply a separate QCL assumption (for example, a method according to the aforementioned embodiment such as QCL type A, QCL type A excluding the CSI-RS port, or "QCL-less" decoding method utilizing only the DMRS (for example, a newly defined QCL type C)) defined for reception of a broadcast/multicast PDSCH at the time of receiving a broadcast/multicast PDSCH (or MCCB-PDSCH or MCCB packet).

In another method, the aforementioned operation may increase implementation complexity of a UE, and therefore the UE may be limited to decode only one type of a PDSCH at a time. For example, the UE does not expect that an MCCB-PDSCH and a unicast PDSCH are scheduled simultaneously within one subframe. Therefore, once the UE detects one type of DCI from within one subframe, it is not necessary for the UE to perform BD of a different type of DCI any more within the corresponding subframe.

Also, to further reduce implementation complexity of the UE, for example, a semi-static configuration may be provided to the UE, which requires BD of only one DCI between DCI masked by an MCCB-RNTI and DCI masked by a C-RNTI within a subframe. The semi-static configuration may be defined/operated so as to be performed only during a limited, specific time period. In other words, in a mode/period in which the UE is configured to monitor DCI masked by an MCCB-RNTI, the UE may be limited not to monitor the DCI masked by a C-RNTI. On the other hand, in a mode/period in which the UE is configured to monitor DCI masked by a C-RNTI, the UE may be limited not to monitor the DCI masked by an MCCB-RNTI.

In an additional embodiment, among QCL-related LSPs for receiving MCCB packets (for example, Doppler shift, Doppler spread, average gain, average delay and/or delay spread), it may be guaranteed that a QCL assumption with a specific RS (for example, serving-cell CRS, CRS of an indicated specific cell, or indicated specific CSI-RS) is applied at least to "Average delay". That the QCL assumption with a specific RS may be applied to average delay indicates that the UE may apply the same FFT window used for receiving the corresponding, specific RS to receive MCCB packets. In other words, since the UE is able to apply a single FFT window, the aforementioned operation is advantageous in view of implementation complexity of a UE and also effective in ensuring reliable reception performance.

And/or among LSPs, "Doppler shift" may also be ensured to apply the QCL assumption with a specific RS (for example, serving-cell CRS, CRS of an indicated specific cell or indicated specific CSI-RS) thereto. This fact may indicate that frequency oscillator errors among multi-cells performing MCCB packet transmission are ensured not to be increased beyond a predetermined level. Also, the fact above may indicate that MCCB packet transmission from multiple cells is ensured, where frequency synchronization is ensured to some degree. Therefore, the UE may apply directly or utilize the "Doppler shift" LSP value obtained through an indicated specific RC for channel estimation to receive of MCCB packets.

LSPs to which the QCL assumption may be applied may be limited to "average delay" and/or "Doppler shift", and for other LSPs, QCL-less channel estimation and data decoding including the embodiment proposed by the present invention may be performed. Since, in the representative examples of "Doppler spread" and "delay spread", transmission of an MCCB packet through individual cells may provide an effect of transmitting the packet through an SFN, and Doppler spread due to (high) mobility of a UE such as a V-UE and delay spread due to multiple cell transmission are occurred, a QCL assumption with an RS of a specific single cell may be defined not to be applied.

Also, in an additional embodiment, a scheduling grant for an MCCB packet may be provided by a specific Enhanced PDCCH (EPDCCH). For example, while an MCCB packet is delivered through multiple cell transmission, the EPDCCH which schedules transmission of the MCCB packet may be provided down from a single cell or even in the form of cross-SF scheduling at a different time point. In this case, at the time of channel estimation for receiving an MCCB packet, the UE may be configured so that a QCL assumption with an EPDCCH (DMRS) may be applied to a specific LSP(s) (where the EPDCCH schedules the specific LSP(s)). The UE's operation above may be allowed to apply QCL assumptions with other RSs, through which reliable performance in receiving an MCCB packet may be ensured.

Up to this point, for the convenience of descriptions, it was assumed that an MCCB-PDSCH is scheduled dynamically by a specific DCI; however, the MCCB-PDSCH may also be transmitted periodically by specific semi-persistent scheduling, and in this case, too, embodiments proposed by the present invention may be applied in the same manner.

So far, embodiments have been described with respect to reception of an MCCB packet, but the methods according to the present invention may also be applied in the same manner/in a similar manner to the case of decoding a specific (DMRS-based) PDSCH having different characteristics.

Figure 11:
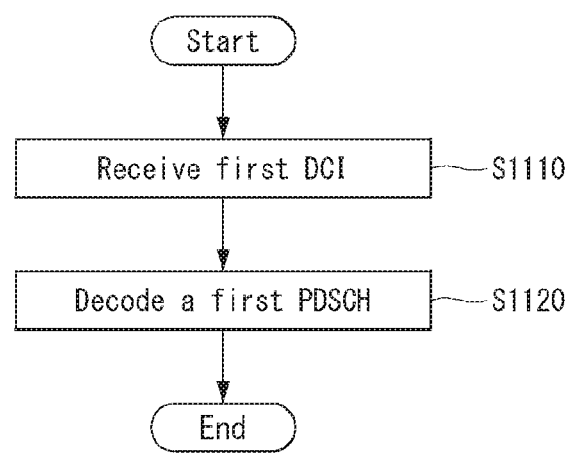
FIG. 11 is a flow diagram illustrating a method for receiving a PDSCH by a UE according to one embodiment of the present invention.

FIG. 11 is a flow diagram illustrating a method for receiving a PDSCH by a UE according to one embodiment of the present invention. The embodiments described above may also be applied in the same manner/in a similar manner to the present flow diagram, and therefore repeated descriptions thereof will be omitted.

First, the UE may receive first DCI about a first PDSCH S1110. Here, the first PDSCH may be a PDSCH broadcast/multicast from a plurality of cells belonging to one cluster. Also, the first DCI and the first PDSCH may be transmitted to the UE by being masked by a first RNTI defined for indicating data broadcast/multicast from one cluster.

Next, the UE may decode the first PDSCH transmitted from a DMRS antenna port on the basis of the first DCI S1120.

At the time of decoding the first PDSCH, the UE may not apply a quasi co-located (QCL) assumption with an antenna port of a reference signal (RS) type different from that of the DMRS antenna port to the DMRS antenna port or applies the QCL assumption with only an antenna port of a particular RS type thereto. More specifically, when the UE does not apply the QCL assumption with an antenna port of a specific RS type, the UE may estimate the channel and/or large-scale parameter (LSP) of the first PDSCH by using only a DMRS transmitted through the DMRS antenna port. Also, when the UE applies a QCL assumption with only an antenna port of a particular RS type, the UE may estimate the channel and the LSP of the first PDSCH by applying a QCL assumption with only a CRS antenna port to the DMRS antenna port.

In addition to the descriptions above, various embodiments for the UE to decode a PDSCH are the same as described above, and repeated descriptions thereof will be omitted.

Device to which the Present Invention May be Applied in General

Figure 12:
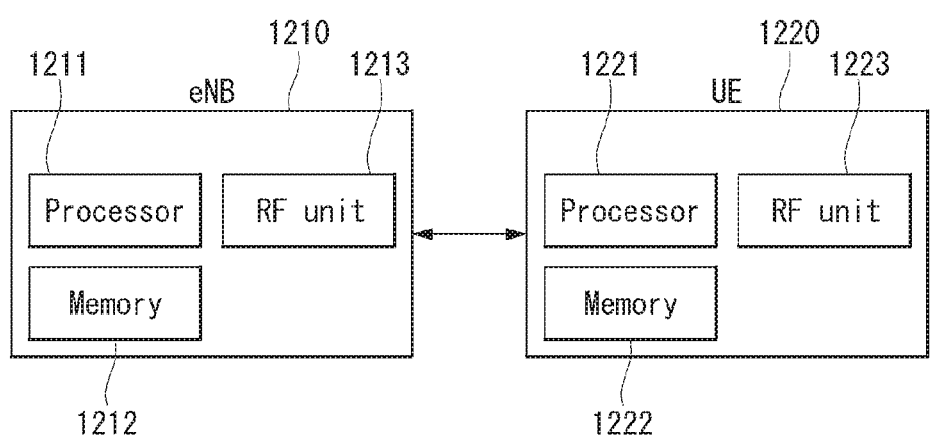
FIG. 12 illustrates a block diagram of a wireless communication device according to one embodiment of the present invention.

FIG. 12 illustrates a block diagram of a wireless communication device according to one embodiment of the present invention.

Referring to FIG. 12, a wireless communication system comprises an eNB 1210 and a plurality of UEs 1220 located within the coverage area of the eNB 1210.

The eNB 1210 comprises a processor 1211, memory 1212, and radio frequency (RF) unit 1213. The processor 1211 implements the functions, processes and/or methods described with reference to FIGS. 1 to 11. Layers of a wireless interface protocol may be implemented by the processor 1211. The memory 1212, being connected to the processor 1211, stores various kinds of information to operate the processor 1211. The RF unit 1213, being connected to the processor 1211, transmits and/or receives a radio signal.

The UE 1220 comprises a processor 1221, memory 1222, and RF unit 1223. The processor 1220 implements the functions, processes and/or methods proposed in the embodiments described above. Layers of a wireless interface protocol may be implemented by the processor 1221. The memory 1222, being connected to the processor 1221, stores various kinds of information to operate the processor 1221. The RF unit 1223, being connected to the processor 1221, transmits and/or receives a radio signal.

The memory 1212, 1222 may be installed inside or outside the processor 1211, 1221 and may be connected to the processor 1211, 1221 via various well-known means. Also, the eNB 1210 and/or the UE 1220 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

The present invention has been described with reference to examples based on the 3GPP LTE/LTE-A system among wireless communication systems; however, the present invention may be applied to various other types of wireless communication systems in addition to the 3GPP LTE/LTE-A system.

What is claimed is:

1. A method for decoding a physical downlink shared channel (PDSCH) by a user equipment (UE) in a wireless communication system, comprising:
receiving configuration indicating which downlink control information (DCI) the UE performs blind detection (BD) among first DCI masked by a first radio network temporary identifier (RNTI) or second DCI masked by a second RNTI,
wherein the configuration information is applied to the UE for performing the BD for DCI for a specific time period;
performing the BD (i) for the first DCI related to a first PDSCH masked by the first RNTI and (ii) for the second DCI related to a second PDSCH masked by the second RNTI based on the configuration information, wherein based on the configuration information, the BD for the first DCI is performed for a first time period different from a second time period for which the BD for the second DCI is performed; and decoding the first PDSCH transmitted through a demodulation reference signal (DMRS) antenna port based on the first DCI, wherein the decoding the first PDSCH is based on first large scale-parameters (LSPs) related to channel estimated by applying only a specific type of QCL assumption between the DMRS antenna port and an antenna port of a specific RS type among a plurality of QCL assumptions, wherein the decoding the first PDSCH is further based on second LSPs estimated based on only a DMRS transmitted through the DMRS antenna port without applying any QCL assumption between the DMRS antenna port and antenna port related to other RS, and wherein the first PDSCH is scheduled within a bandwidth includes at least a predetermined number of resource blocks (RBs) or more.

2. The method of claim 1, wherein the first PDSCH is a PDSCH broadcast/multicast from a plurality of cells belonging to one cluster.

3. The method of claim 2, wherein the first RNTI is defined for indicating data broadcast/multicast from the one cluster, and wherein the second RNTI is different type of RNTI from the first RNTI.

4. The method of claim 3, wherein, when based on the specific QCL assumption applies to the decoding the first PDSCH, the specific QCL assumption is a QCL assumption between a cell-specific reference signal (CRS) antenna port and the DMRS antenna port.

5. The method of claim 3, further comprising:

decoding the second PDSCH in a same subframe in which the first PDSCH is transmitted, wherein the second PDSCH is decoded by applying a QCL assumption different from a QCL assumption applied for decoding of the first PDSCH.

6. The method of claim 3, wherein the first DCI is restricted not to be transmitted together with the second DCI in a same subframe.

7. The method of claim 6, wherein the first time period and the second time period are set individually.

8. The method of claim 3, wherein, whether to apply the specific type of QCL assumption between the DMRS antenna port and the antenna port of the RS type different from the DMRS is determined for each LSP.

9. The method of claim 8, wherein the first LSPs includes only an Average delay parameter and/or a Doppler shift parameter.

10. The method of claim 3, wherein the first DCI is transmitted through a physical downlink control channel (PDCCH) or enhanced PDCCH (EPDCCH).

11. The method of claim 1, wherein the predetermined number of scheduled RBs are predefined by a specific value or set for the UE through a radio resource control (RRC) message or system information block (SIB) message.

12. A user equipment (UE) decoding a physical downlink shared channel (PDSCH) in a wireless communication system, comprising:

a Radio Frequency (RF) unit including a transceiver for transmitting and receiving a radio signal; and a processor controlling the RF unit, wherein the processor is configured to:

receive configuration indicating which downlink control information (DCI) the UE performs blind detection (BD) among first DCI masked by a first radio network temporary identifier (RNTI) or second DCI masked by a second RNTI, wherein the configuration information is applied to the UE for performing the BD for DCI for a specific time period;

perform the BD (i) for the first DCI related to a first PDSCH masked by the first RNTI and (ii) for the second DCI related to a second PDSCH masked by the second RNTI based on the configuration information, wherein based on the configuration information, the BD for the first DCI is performed for a first time period different from a second time period for which the BD for the second DCI is performed; and decode the first PDSCH transmitted through a demodulation RS (DMRS) antenna port based on the first DCI, wherein the decoding the first PDSCH is based on first large scale-parameters (LSPs) related to channel estimated by applying only a specific type of QCL assumption between the DMRS antenna port and an antenna port of a specific RS type among a plurality of QCL assumptions, wherein the decoding the first PDSCH is further based on second LSPs estimated based on only a DMRS transmitted through the DMRS antenna port without applying any QCL assumption between the DMRS antenna port and antenna port related to other RS, and wherein the first PDSCH is scheduled within a bandwidth includes at least a predetermined number of resource blocks (RBs) or more.

13. The UE of claim 12, wherein the first PDSCH is a PDSCH broadcast/multicast from a plurality of cells belonging to one cluster.

* * * * *